UNITED STATES PATENT OFFICE.

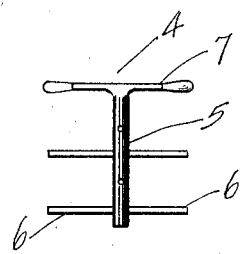
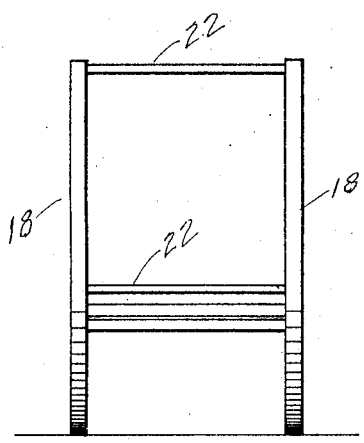
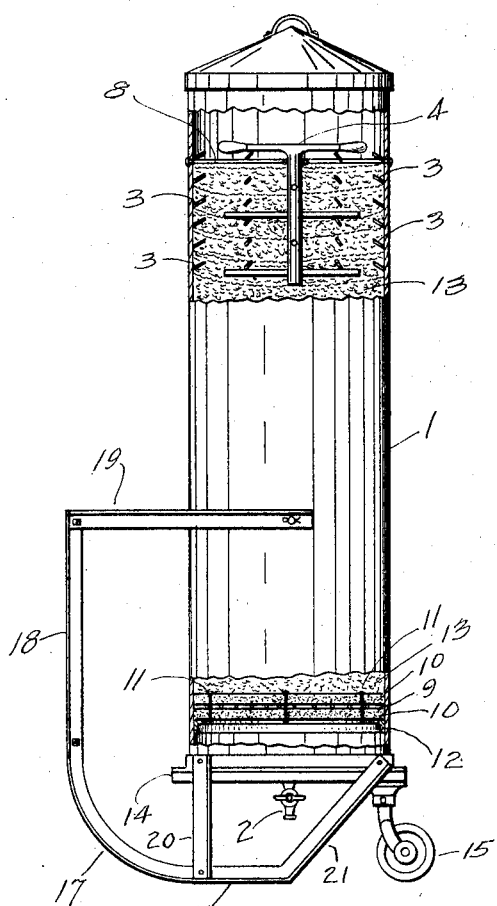

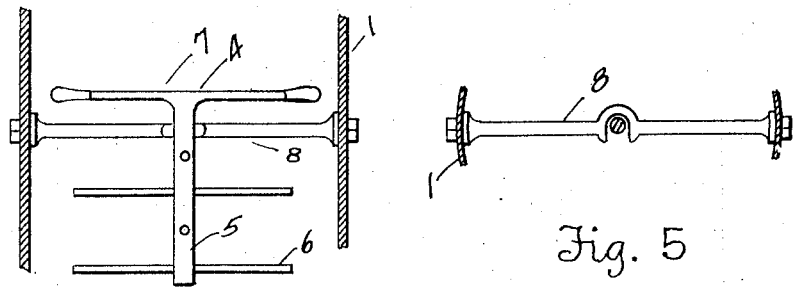
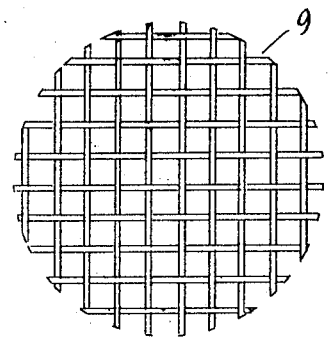
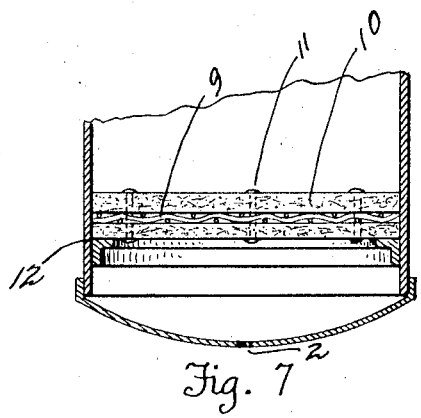
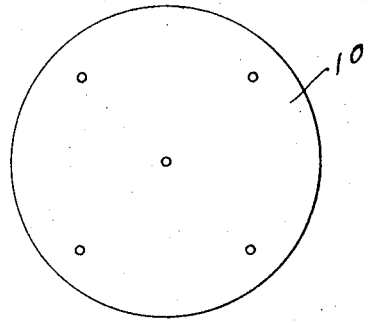

JOHN H. F. EVERSZ, OF WALLA WALLA, WASHINGTON.

PORTABLE FILTER.

1,335,282.

Specification of Letters Patent.

Patented Mar. 30, 1920.

Application filed May 14, 1919. Serial No. 297,109.

*To all whom it may concern:*

Be it known that I, JOHN H. F. EVERSZ, a citizen of the United States, residing at Walla Walla, in the county of Walla Walla and State of Washington, have invented certain new and useful Improvements in Portable Filters, of which the following is a specification.

This invention relates to that class of gravity filters used in filtering gasolene in clothes cleaning establishments, which has sawdust as its principal filtering element, and which is portable.

One of the objects of this filter is to provide a portable filter that may be moved from place to place.

A further object is to provide a means whereby the filtering element may be partially suspended to prevent packing.

A further object is to provide a means whereby the filtering element may be agitated and the hard crust broken to destroy air pockets which form in the filtering element in the use of gasolene.

A further object is to provide a means whereby the filtering element may be readily removed and renewed and a means in connection therewith by which the filter may be moved from place to place as desired.

With these and other objects in view reference is now had to the accompanying drawings in which—

Figure 1 is a side elevation of the filter with parts broken away;

Fig. 2 is a front elevation of the frame;

Fig. 3 is a side elevation of the agitator;

Fig. 4 is a plan view of the yoke bar;

Fig. 5 is a plan view of the yoke bar on the line 5—5 of Fig. 6;

Fig. 6 is a side elevation of the yoke bar and agitator;

Fig. 7 is a sectional view of the filtering pad, its support, and bottom of container;

Fig. 8 is a plan view of a grid; and

Fig. 9 is a plan view of one of the pads.

In the drawings similar reference numerals represent similar parts and 1 represents the reservoir which is made of any suitable material and having an outlet 2 in the lower or bottom part thereof and in the upper part a series of suspension lugs 3 attached to the inner periphery of the wall of the reservoir and extending inwardly to engage a filtering element and hold it in partial suspension.

An agitator 4 consisting of a post 5 and radially extending arms 6 and having a handle bar 7 is movably and removably supported by a yoke bar 8 which is attached to the walls of the reservoir in any suitable manner.

In the lower portion of the reservoir is a filtering pad consisting of a rigid grid 9 centrally disposed between two felt pads 10, the whole combined to form a rigid mass by the rivets 11. It will be noted here that any means may be employed to hold the parts of the pad together although the form shown is preferred. The pad is removably supported in the bottom of the reservoir in any suitable manner as at 12.

A filtering element 13, consisting of sawdust, rests on the filtering pad with its upper portion partially suspended by the suspension lugs 3.

The filter rests on a frame 14 and is one of the principal novel features of the invention as by this means the filter is made portable and the operation of renewing the filtering element is facilitated. The frame has caster wheels 15 mounted directly behind the skids 16 and these skids are bent to form a rocker 17 while the extensions 18 forming the handle bars also form other skids, or supports, which become skids when the filter is lowered. The frame parts 19 are suitably braced to the reservoir 1 and also to the frame by the braces 20 and 21 respectively. Cross braces 22 are also provided to strengthen the frame and these cross pieces are used as a handle with which to move the filter from place to place.

A sawdust filtering element is employed as the most satisfactory for clarifying gasolene, but as sawdust is old in the art I do not claim it as new, however I have discovered that the fault of sawdust as a filtering element is its tendency to "pack" at the entrance point of the gasolene and therefore I do claim as new the breaking up of this "pack" by means of the agitator 4 and the suspension lugs 3 above mentioned for the following reasons:—

As gasolene is poured into the filter it settles the sawdust to a degree varying with the depth, the top layers becoming very dense, due to the sediment in the unfiltered gasolene filling the voids; the top layers then become so dense that gasolene is prevented from passing through the sawdust. Another fault which also occurs is that of a gas trap forming in the body of the filter, being trapped by the crust and the compact mass formed at the top; therefore to overcome this I provide the suspension lugs 3 which hold the upper portion of the sawdust in partial suspension, sufficiently so, that the agitator, being manually operated, may break up the crust, loosening the filtering element and destroying the gas trap.

The weight of the filtering element is carried by the filtering pad, consisting of a rigid grid placed between two layers of felted material and bound together preferably by rivets, although any suitable means may be used for the purpose.

The frame is substantially made of angle iron, or any suitable material and by means of the caster wheels the filter may be transported to any part of the establishment for use as desired, and by tipping the filter over on the skids 18, or handle bars, convenient access is had to the filtering element for either agitating the element, or removing the element for renewal purposes.

The outlet 2 may consist of a valve, a cock, or simply a hose connection, or any means for withdrawing the filtered contents.

The agitator is supported by the yoke bar in which it is free to turn and which prevents the agitator from sinking into the filtering element farther than is necessary.

In operation the reservoir is tipped over on its side and the filtering pad is placed; the filtering element is then added filling the reservoir to the yoke bar, the agitator being placed in the yoke of the yoke bar before the filling is completed; the filter is now raised to a vertical position, and by aid of the caster wheels on the frame, is transported to the place of operation; the gasolene to be filtered is now pumped or poured into the filter and filtration immediately takes place. I may now attach a hose to the outlet and convey the filtered gasolene by this means to the tank or I may fill the reservoir and transport the filter to a point directly over the tank and there remove the contents.

In case of a constant run being contemplated the filter is placed conveniently to the work and the tank and the crust forming on top is periodically broken up by means of the agitator without delaying the run.

I thus provide a cheaply constructed filter and am able to filter large quantities of gasolene in a short space of time and at any convenient place in the establishment.

Having thus described my invention I claim—

1. In a portable filter, a reservoir, an outlet, suspension lugs attached to the reservoir, and arranged to loosely support a filtering element, an agitator, movably and removably supported by a yoke bar, a rigid filtering pad in said reservoir, a filtering element loosely supported by said suspension lugs and resting on said rigid filtering pad, and a portable rocker frame supporting the filter.

2. In a portable gravity filter, a reservoir, an outlet in the bottom of the reservoir, suspension lugs attached to the inner periphery of the wall of the reservoir, extending inwardly and arranged to loosely support the upper portion of the filtering element, an agitator in the reservoir movably and removably supported by a yoke bar, a filtering pad composed of a felted material alternating with a rigid grid in said reservoir, a filtering element loosely supported by said suspension lugs and resting on the filtering pad, and a portable rocker frame supporting the filter.

3. In a portable, tiltable, gravity filter, a reservoir, an outlet, suspension lugs in the reservoir, an agitator consisting of a post having arms extending radially therefrom, and a handle bar on the upper portion of the post, a yoke bar supported by the side walls of the reservoir and disposed diametrally to support the agitator, a filtering pad composed of a rigid grid centrally disposed between felt pads and the whole rigidly bound together in said reservoir, a filtering element supported by said filtering pad and having its top portion maintained in partial suspension by said suspension lugs, in combination with a portable rocker frame whose rear supports are caster wheels and whose front supports are skids, said skids terminating in a rocker with the rocker extended to form handle bars.

4. In a portable, tiltable, gravity filter, a reservoir, an outlet in said reservoir, a series of suspension lugs attached to the inner periphery of the wall of the reservoir at the upper end thereof and extending inwardly, a manually operated agitator movably and removably supported by a yoke bar, a rigid filtering pad removably supported in the lower portion of the reservoir, a filtering element having its upper portion maintained in partial suspension by means of said suspension lugs and resting on said filtering pad, in combination with a portable rocker frame.

In testimony whereof I affix my signature.

JOHN H. F. EVERSZ.